United States Patent [19]

Huang et al.

[11] Patent Number: 5,220,397
[45] Date of Patent: Jun. 15, 1993

[54] METHOD AND APPARATUS FOR ANGLE MEASUREMENT BASED ON THE INTERNAL REFLECTION EFFECT

[76] Inventors: Peisen Huang, 2252 Cram Pl., Apt. 2, Ann Arbor, Mich. 48105; Satoshi Kiyono, Tohoku University, Dept. of Mechtronics, Sendai 980, Japan

[21] Appl. No.: 857,380

[22] Filed: Mar. 25, 1992

[51] Int. Cl.$^5$ .............................................. G01B 11/26
[52] U.S. Cl. .................................... 356/140; 356/152
[58] Field of Search ............... 356/140, 141, 152, 376, 356/123; 250/204

[56] References Cited

U.S. PATENT DOCUMENTS

| | | | |
|---|---|---|---|
| 4,390,781 | 6/1983 | Musha | 250/204 |
| 4,425,043 | 1/1984 | van Rosmalen | 356/152 X |
| 4,502,783 | 3/1985 | Lau et al. | 356/152 |
| 4,505,584 | 3/1985 | Kato et al. | 356/123 |
| 4,721,386 | 1/1988 | Collyer | 356/152 |
| 4,930,896 | 6/1990 | Horikawa | 356/376 |
| 5,071,226 | 12/1991 | Audion et al. | 356/152 X |

OTHER PUBLICATIONS

G. D. Chapman, "Inferferometric Angular Measurement", Applied Optics, vol. 13, #7, Jul. 1974.
A. E. Ennos et al., "High Accuracy Profile Measurement of Quasi-Conical Mirror Surfaces by Laser Autocollimation", Precision Engineering, vol. 4, #1, Jan. 1982.
D. Malacara et al., "Interferometric Measurement of Angles", Applied Optics, vol. 9, #7 Jul. 1970.
J. Rohlin, "An Interferometer for Precision Angle Measurements", Applied Optics, vol. 2, #7, Jul. 1963.
F. J. Schuda, "High-Precision, Wide-Range, Dual-Axis, Angle Monitoring System", Rev. Sci. Instrum., vol. 54, #12, Dec. 1983.
Pan Shi et al., "New Optical Method for Measuring Small-Angle Rotations", Applied Optics, vol. 27, #20, 15 Oct. 1988.
P. R. Yoder et al., "Active Annular Beam Laser Autocollimator System" Applied Optics, vol. 14, #8, Aug. 1975.
L. D. Hutcheson, "Practical Electrooptic Deflection Measurements System", Optical Engineering, vol. 15, #1, Jan.–Feb., 1976.
"Straightor" TC-2, Chuo Precision Industrial Co., Ltd., Brochure.
R. C. Quenelle et al., "A New Microcomputer-Controlled Laser Dimensional Measurement and Analysis System", Hewlett-Packard Journal, Apr. 1983.
T. Takano et al., "Basic Investigations on an Angle Measurement System Using a Laser", IEEE Transactions on Aerospace and Electronic Systems, vol. 26, #4, Jul. 1990.

*Primary Examiner*—Mark Hellner
*Attorney, Agent, or Firm*—James M. Deimen

[57] ABSTRACT

A new method of angle measurement is based on the internal reflection effect at an air/glass boundary. The method uses a differential detection scheme to largely reduce the inherent non-linearity of the reflectance versus the angle of incidence in internal reflection. With non-linearity reduced, the displacement of the angle of incidence can be determined accurately by measuring the reflectance. The resolution and measurement range are determined by the initial angle of incidence, the polarization state of light, and the number of reflections. Compared with interferometers and autocollimators, this method has the advantage of a simple sensor design for applications ranging from very wide measurement range to extremely high resolution. Apparatus for accomplishing the method comprises a beamsplitter, a pair of critical angle prisms and a pair of photodiodes. Each photodiode measures change in reflectance and with the application of suitable computation means produces an angle measurement of the beam incident to the beamsplitter.

15 Claims, 9 Drawing Sheets

METHOD AND APPARATUS FOR ANGLE MEASUREMENT BASED ON THE INTERNAL REFLECTION EFFECT

BACKGROUND OF THE INVENTION

The field of the invention pertains to the optical measurement of angles for a variety of scientific and industrial purposes.

Optical measurement of angles is conventionally performed using either an interferometer or an autocollimator. The interferometer is based on the principle of interference of two laser beams which traverse slightly different optical paths whenever an angular displacement occurs. Various configurations have been developed and investigated for improving the accuracy and simplifying the structure. Among them, HP5528A interferometer measurement system from Hewlett-Packard Corporation is probably the most reliable and widely used instrument, especially in the calibration and accuracy maintenance of machine tools and Coordinate Measuring Machines (CMMs).

An autocollimator measures an angular displacement by detecting the lateral displacement of a laser beam reflected from a mirror subjected to the angular displacement. Traditional autocollimators with manual operation have long been used for alignment. Their accuracy is usually around one second of arc. More recent laser opto-electronic autocollimators show higher accuracy and are used for surface profiling of optical elements, geometric error measurement of machine tools, and laser mirror servocontrols. Although both methods provide high resolution, devices based on these principles are usually large, making the devices hard to integrate with machines for on-line measurement.

U.S. Pat. No. 4,390,781 discloses a method and apparatus for detecting the focussing error signal of an objective lens. The method and apparatus utilize a polarizing beamsplitter inserted between a collimating lens and an objective lens. The beamsplitter reflects light flux into a detection prism with a reflection surface and thereby to a light detector.

U.S. Pat. No. 4,505,584 discloses further improvements in the method and apparatus of the above patent comprising the application of specific thin films of alternating index of refraction to the prism. The result is improved sensitivity of the detector without appreciable increase in size of the prism.

U.S. Pat. No. 4,930,896 discloses a surface structure measuring apparatus that utilizes a focus detecting system with light deflectors conjugate to the pupil of an objective lens. Pertinent to the new method and apparatus described below is the apparatus shown in FIG. 3 wherein two prisms and two photo-detectors are used as a part of a surface measuring device. The three patents above, however, are generally directed to surface measurement as distinguished from angle measurement.

SUMMARY OF THE INVENTION

The invention comprises a new method of angle measurement, namely angle measurement based on the internal reflection effect. This method utilizes the characteristics of internal reflection of a laser beam in the vicinity of the critical angle of an air/glass boundary. A differential detection scheme is used to largely reduce the inherent non-linearity of the reflectance versus the angle of incidence. Thus, the angular displacement of the laser beam can be accurately measured by the detection of the reflectance. Because of the nature of direct angular displacement measurement and the simple structure of the method, devices based on this principle are compact. A sensor which can measure small angular displacement up to 3 minutes of arc with a resolution of 0.02 seconds of arc has a physical size of only $50 \times 50 \times 25$ mm and weighs only 70 g.

Another very important advantage of this method is that sensors for various applications, ranging from very wide range measurement to extremely high resolution measurement, can be designed by simply altering the sensor parameters, such as the initial angle of incidence, the polarization state, and the number of reflections of the laser beam. Because of these two major advantages over conventional methods, this new method is especially suitable for applications including cantilever deflection detection and control of Atomic Force Microscopes (AFMs), surface profiling of optical elements, vibration analysis, on-line geometric error measurement and compensation of machine tools and CMMs, laser pointing accuracy controls, and laser mirror servocontrols.

Although for wide range measurement or extremely high resolution measurement a polarized laser beam is preferably because parameters can be optimized for best performance, the new method can be performed with non-polarized light. Moreover, the new method is not restricted to any particular wavelength of light and is applicable to both internal and external reflection at the boundary between materials of differing index of refraction. The theory is also correct for transmission measurement instead of reflection measurement.

DESCRIPTION OF THE PREFERRED EMBODIMENT

Measurement Principle

Figure 1:
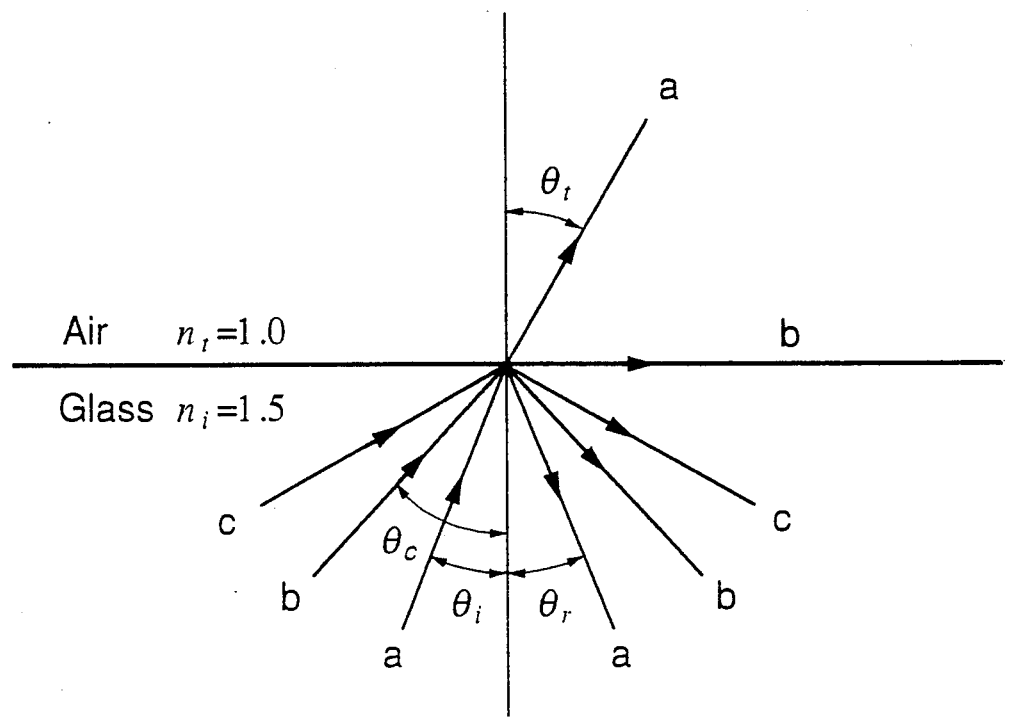
FIG. 1 illustrates the internal reflection of light beams at an air/glass interface.

Whenever light impinges on the interface of two media, some of the light is reflected and some of the light is transmitted (undergoing refraction) into the second medium. FIG. 1 illustrates the internal reflection case in which light is incident from a higher index medium (Glass $n_i=1.5$) to a lower index medium (Air $n_t=1.0$). The amplitude of the reflected light is a function of the ratio of the refractive index of the two materials, the polarization of the incident light, and the angle of incidence. Fresnel's laws of reflection precisely describe the amplitude and phase relationship between the reflected and the incident light. By thinking of incident radiation as the superposition of two linearly polarized beams, one with its electric field parallel to the plane of incidence (p-polarized) and the other with its electric field perpendicular to the plan of incidence (s-polarized), Fresnel's laws can be represented in the following two equations giving the reflectance of the s- and p-polarization components:

$$R_s = \left( \frac{\sin(\theta_i - \theta_t)}{\sin(\theta_i + \theta_t)} \right)^2 \quad (1)$$

$$R_p = \left( \frac{\tan(\theta_i - \theta_t)}{\tan(\theta_i + \theta_t)} \right)^2 \quad (2)$$

Where $\theta_i$ and $\theta_t$ are related by Snell's law:

$$n_i \sin\theta_i = n_t \sin\theta_t \quad (3)$$

Figure 2:
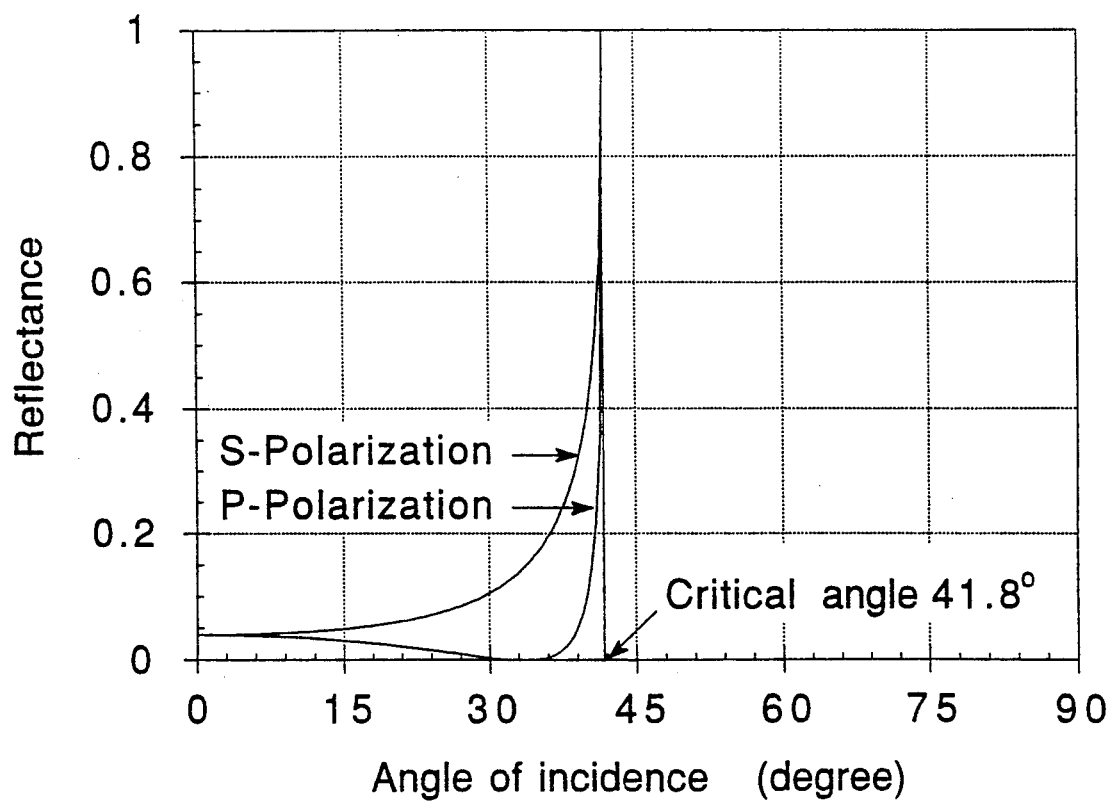
FIG. 2 is a graph of reflectance of internal reflection at an air/glass interface.

From Eq. (1) to Eq. (3), it is clear that reflectances $R_s$ and $R_p$ are functions of the angle of incidence $\theta_i$. FIG. 2 displays the curves of the reflectances $R_s$ and $R_p$ versus the angle of incidence $\theta_i$ for the internal reflection case shown in FIG. 1. As can be seen from this figure, in the case of internal reflection the reflectance of both s- and p-polarized beams undergoes a slow change for small angles of incidence but a sharp increase in the vicinity of the critical angle which is determined by the equation $\theta_c = \arcsin(n_t/n_i)$. The characteristics of reflectances $R_s$ and $R_p$ as functions of the angle of incidence $\theta_i$ can be used for angle measurement since reflectance or transmittance of the light beam can be easily detected using a photodiode or other photo-sensitive devices. When the incident beam lies in the vicinity of the critical angle this method provides high resolution. Unfortunately, the reflectance is inherently nonlinear with respect to the angle of incidence, which makes it difficult to be used for angle measurement.

To overcome the problem and make use of this characteristic in angle measurement, methods need to be developed to largely reduce this non-linearity. By both theoretical analysis and experimental results, it is found that a differential method can be applied to solve this problem. FIG. 2 shows that the reflectances change slowly when the angle of incidence is small and very fast in the vicinity of the critical angle. The slopes of the reflectance continuously increase as the angle of incidence increases up to the critical angle (for the reflectance of p-polarization, consider only the region where the angle of incidence is beyond the Brewster's angle). Therefore, if we can measure the angular displacement relative to an initial angle of incidence using both the low and high slope sides of the reflectance and then take the average of these two measured results, the nonlinearity can be largely reduced. This heuristic argument is found correct by the following theoretical analysis.

Suppose the incident light beam is initially at the angle of $\theta_0$, which is called the initial angle here, and we need to measure the angular displacement of $\Delta\theta$ from this initial angle. The angle of incidence $\theta_i$ equals $\theta_0 + \Delta\theta$. Since $\theta_0$ is a constant, from Eq.(1) to Eq.(3), clearly the reflectances become functions of $\Delta\theta$ and we denote them as $R_s(\Delta\theta)$ and $R_p(\Delta\theta)$. The Taylor series expansion of $R_s(\Delta\theta)$ is:

$$R_s(\Delta\theta) = a_0 + a_1\Delta\theta + a_2\Delta\theta^2 + a_3\Delta\theta^3 + \ldots \quad (4)$$

Where $a_0 = R_s(\theta_0)$, $a_1 = R_s'(\theta_0)$, $$a_2 = \frac{1}{2!} R_s''(\theta_0), \quad a_3 = \frac{1}{3!} R_s'''(\theta_0).$$

Now assume that for a light beam with an angular displacement of $\Delta\theta$, another beam with an angular displacement of $-\Delta\theta$ can always be obtained simultaneously. This additional beam will yield a reflectance $R_s(-\Delta\theta)$, which can be expanded similarly as:

$$R_s(-\Delta\theta) = a_0 - a_1\Delta\theta + a_2\Delta\theta^2 - a_3\Delta\theta^3 + \ldots \quad (5)$$

Subtracting Eq. (5) from Eq.(4) gives the difference of the reflectances $$R_s(\Delta\theta) - R_s(-\Delta\theta) = 2a_1\Delta\theta + 2a_3\Delta\theta^3 + \ldots \quad (6)$$

Notice that compared with the original reflectance $R_s(\Delta\theta)$ in Eq.(4), Eq.(6) has only odd terms left. Its non-linearity error should be much smaller than that of $R_s(\Delta\theta)$. Also, in order to compensate for the incident power change resulting from fluctuations of the incident light power or the nonuniformity of the reflecting surface (the later case occurs when this method is used to measure the inclination of a mirror or the profile of a test surface), the difference of the reflectances is normalized by the sum of the reflectances $R_s(\Delta\theta) + R_s(-\Delta\theta)$. The linearized reflectance $R_{sl}$ is then $$R_{sl} = \frac{R_s(\Delta\theta) - R_s(-\Delta\theta)}{R_s(\Delta\theta) + R_s(-\Delta\theta)} \quad (7)$$

where $$R_s(\Delta\theta) + R_s(-\Delta\theta) = 2a_0 + 2a_2\Delta\theta^2 + \ldots \quad (8)$$

Figure 3:
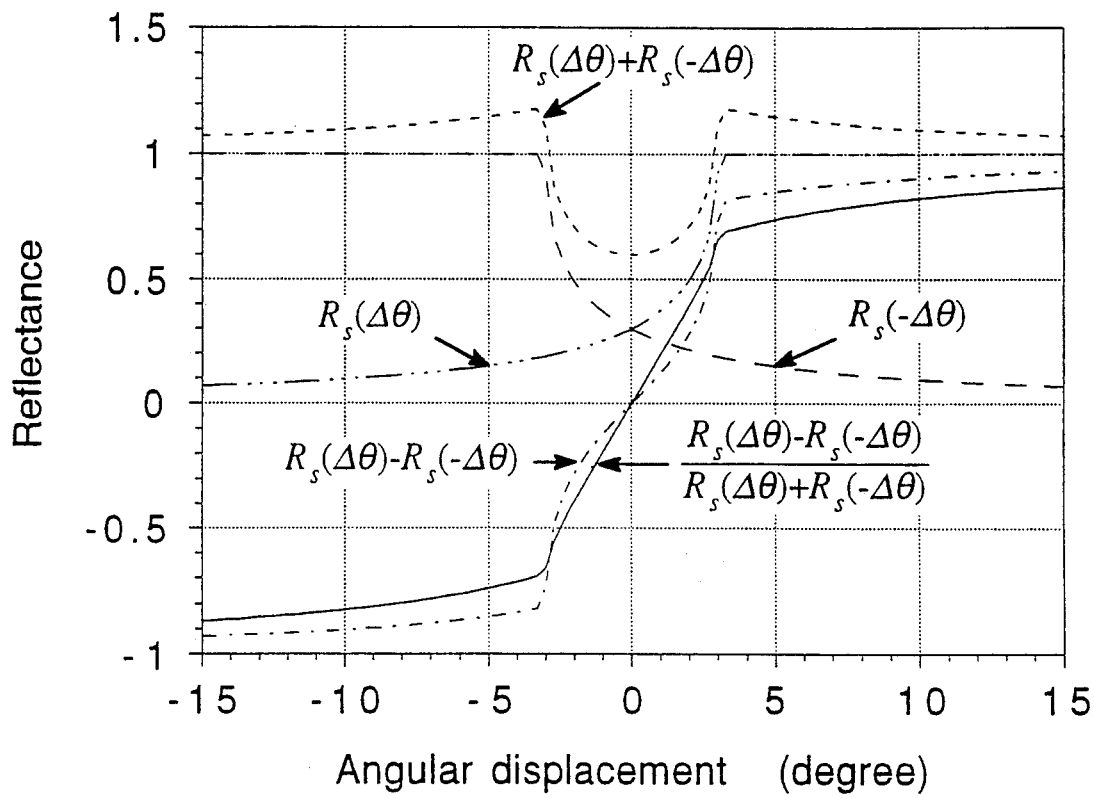
FIG. 3 is a graph of reflectance and linearized reflectance.

In FIG. 3 all the curves resulting from the above equations have been shown. The figure shows that the linearity of $R_{sl}$ versus the angle of incidence is significantly improved. Notice that $R_s(\Delta\theta) + R_s(-\Delta\theta)$ is not constant throughout the measurable range. Rather, it is approximately a parabola. From FIG. 3 it is clear that this normalization not only compensates the effect of the incident power change but also improves the linearity.

Figure 4:
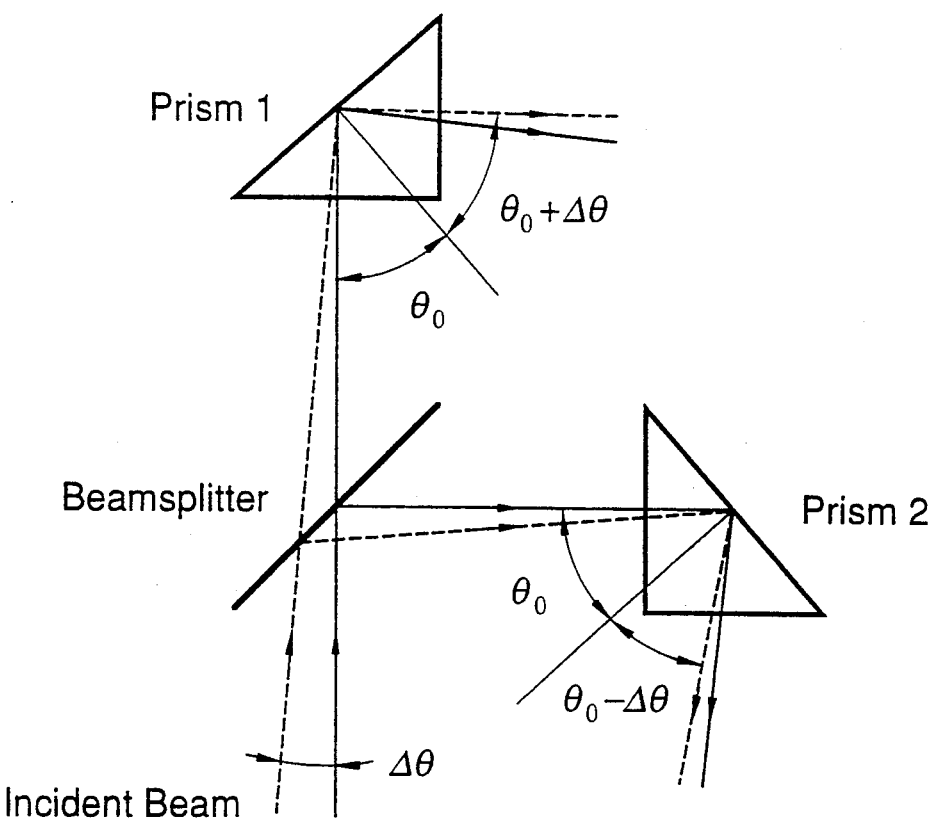
FIG. 4 illustrates the principle of the differential detection method where prism 1 and prism 2 are identical.

The question now is how to obtain the additional beam with an angular displacement of $-\Delta\theta$, whenever the incident beam has an angular displacement of $\Delta\theta$. The means for achieving this are simple and are displayed in FIG. 4. The incident beam is split with a half mirror, and two prisms reflect the two beams simultaneously. These two prisms are initially set so that their hypotenuse faces have the same angle $\theta_O$ with respect to the incident beams. When the incident beam is displaced an amount $\Delta\theta$, the beamsplitter reverses the sign of the angular displacement of the beam at prism 2, while the reflection at prism 1 remains unaffected. The reflection at prism 2 is $R_s(-\Delta\theta)$, if we can assume that the two prisms are identical.

Similarly, for p-polarized light, the reflectance is given by $$R_p(\Delta\theta) = b_0 + b_1\Delta\theta + b_2\Delta\theta^2 + b_3\Delta\theta^3 + \ldots \quad (9)$$

and the linearized reflectance is defined as $$R_{pl} = \frac{R_p(\Delta\theta) - R_p(-\Delta\theta)}{R_p(\Delta\theta) + R_p(-\Delta\theta)} \quad (10)$$

Figure 5:
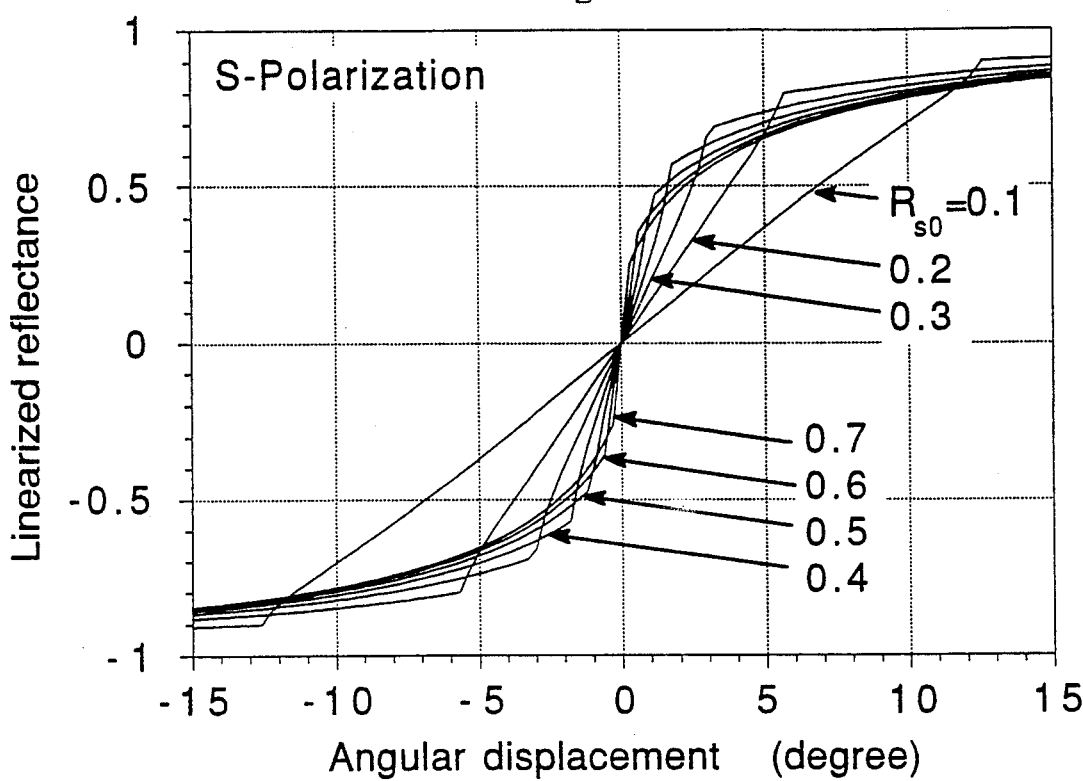
FIG. 5 is a graph of linearized reflectances of s-polarized light for different initial reflectances where $R_{sO}$ is the initial reflectance of s-polarized light.
Figure 6:
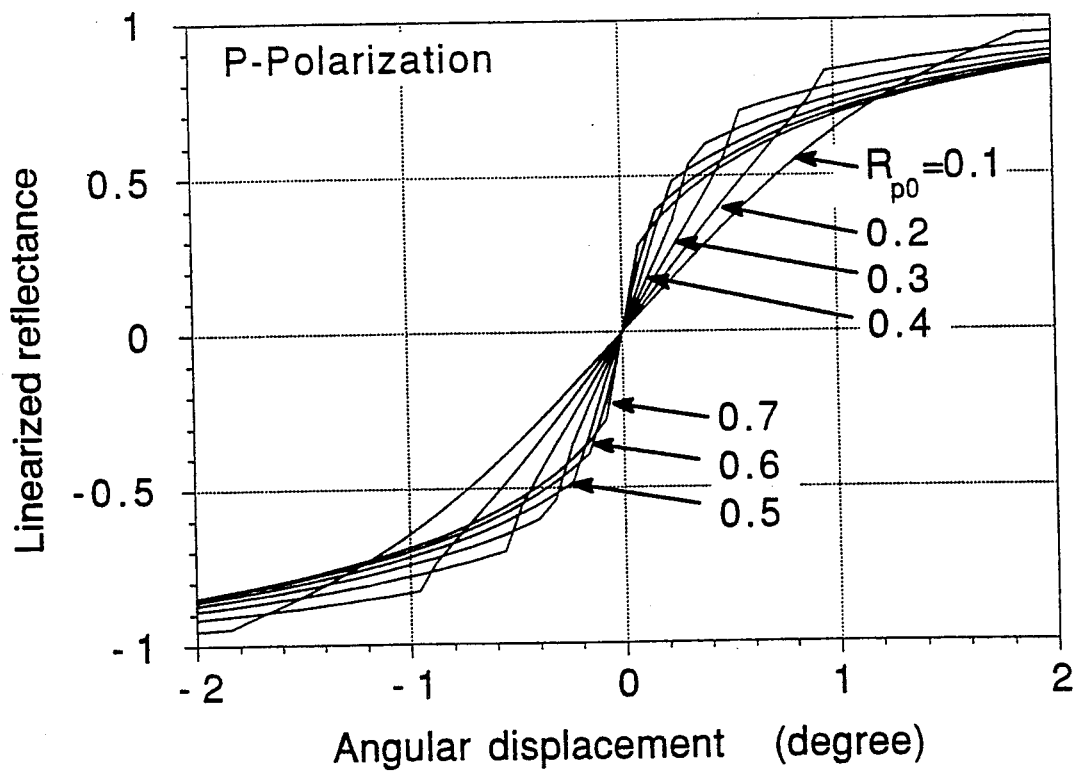
FIG. 6 is a graph of linearized reflectances of p-polarized light for different initial reflectances where $R_{pO}$ is the initial reflectance of p-polarized light.

FIGS. 5 and 6 show the linearized reflectances $R_{sl}$ and $R_{pl}$ versus the incident angular displacement for various $R_{s0}$ and $R_{p0}$. $R_{s0}$ and $R_{p0}$ are the reflectances at the initial angle $\theta_0$.

It can be seen from FIGS. 5 and 6 that the sensitivity of the linearized reflectance with respect to the angular displacement increases with the initial reflectance while the measurement range decreases. Also, the linearized reflectance of the s-polarized light has a larger measurement range, which can well be over 25 degrees and still provide a good linearity. Compared with that of the s-polarized light, the linearized reflectance of p-polarized light has a better sensitivity but the measurement range is much smaller, only about 2 degrees. Hence p-polarized light is only suitable for small angle measurement. It should be pointed out that when a sensor is designed at a low initial reflectance for wide range measurement use, most of the incident light power will be lost by transmission. This is not favorable in terms of efficient use of light power and signal to noise ratio. In such a case, however, transmittance can be measured instead of reflectance. Then, reflectance can be calculated from transmittance since the sum of transmittance and reflectance equals one. To collect the transmitted light more efficiently an additional converging lens which focuses the transmitted beam onto the photodiode might be needed, especially in the wide range application.

Sensitivity and Non-linearity

Sensitivity and non-linearity depend on the polarization state of the light beam, the initial angle of incidence, and the number of reflections inside the prisms. The following theoretical analysis shows this dependency quantitatively. Let $$R_s(\Delta\theta) = c_1\Delta\theta + c_3\Delta\theta^3 + \ldots \quad (11)$$

By deriving the coefficients of the Taylor's series in Eq.(4) and then substituting into Eq.(7), $c_1$ and $c_3$ can be obtained as follows.

$$c_1 = \frac{a_1}{a_O} = 4\tan\theta_t \quad (12)$$

$$c_3 = \frac{a_O a_3 - a_1 a_2}{a_O^2} = \quad (13)$$

$$4\tan\theta_t \left( \frac{1}{2}(n^2 - 1)\sec^4\theta_t - 5\sec^2\theta_t + \frac{16}{3} \right)$$

Similarly, for p-polarized light, let $$R_p(\Delta\theta) = d_1\Delta\theta + d_3\Delta\theta^3 + \ldots \quad (14)$$

Similar analysis shows $$d_1 = \frac{b_1}{b_O} = \frac{4\tan\theta_t}{u}$$

$$d_3 = \frac{b_O b_3 - b_1 b_2}{b_O^2} = 4\tan\theta_t \left( \frac{1}{2}(n^2 - 1)\sec\theta_t + \right. \quad (16)$$

$$\frac{1}{3}\sec^2\theta_t - \frac{1}{3u}(n^2 + 1)(2\cos^2\theta_o\sec^2\theta_t + \cos2\theta_o) +$$

$$\left. \frac{1}{3u^2}(n^2 + 1)^2\sin^22\theta_o - \frac{16}{3u^2}\tan^2\theta_t \right)$$

where $u = -\cos(\theta_o - \theta_t)\cos(\theta_o + \theta_t)$ and $\theta_t$ is the angle of refraction at the angle of incidence of $\theta_o$.

Figure 7:
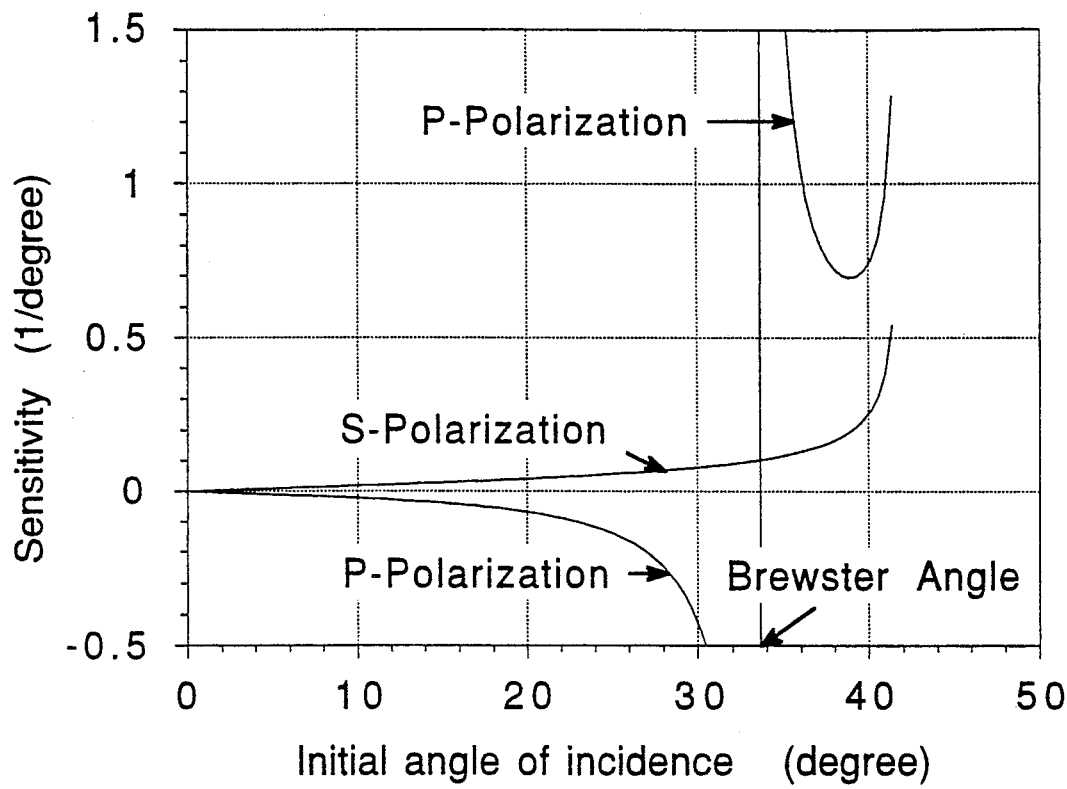
FIG. 7 is a graph of sensitivity of the linearized reflectance.

From Eqs.(11) and (14) we see that if the linearized reflectances are fit by linear lines, $c_1$ and $d_1$ will be the sensitivities and $c_3\Delta\theta^3$ and $d_3\Delta\theta^3$ plus the higher order terms will be the non-linearity errors. In FIG. 7 the sensitivities for both the s-polarization and p-polarization cases versus the initial angle of incidence are shown for comparison. For p-polarized light the curve for an initial angle of incidence smaller than the Brewster Angle has no significant meaning, since the reflectance in this region decreases as the angle of incidence increases. It was found that the non-linearity in this case can be very large. Comparing both curves, we see that the sensitivity for the p-polarization case is much larger than that for the s-polarization case (in the region beyond the Brewster Angle, it is approximately twice as large). It is also apparent that the sensitivities in both cases increase rapidly in the vicinity of the critical angle.

Figure 8:
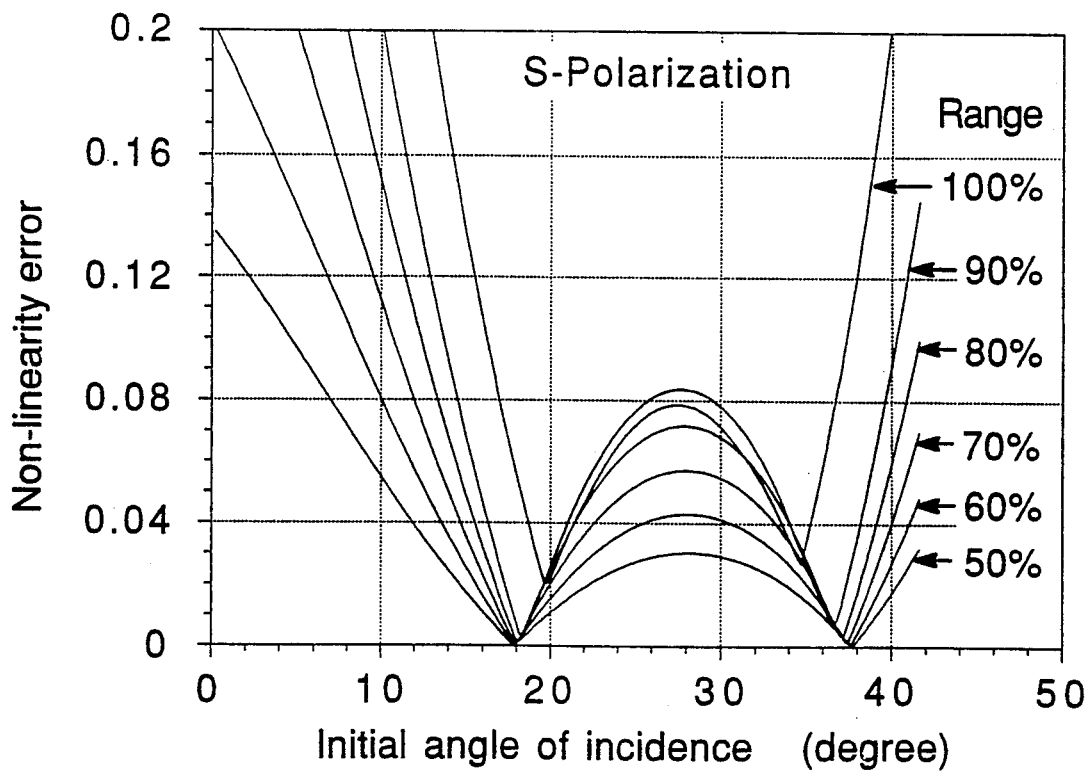
FIG. 8 is a graph of non-linearity error of the linearized reflectance of s-polarized light where "Range" is the percentage of the total measurable range.
Figure 9:
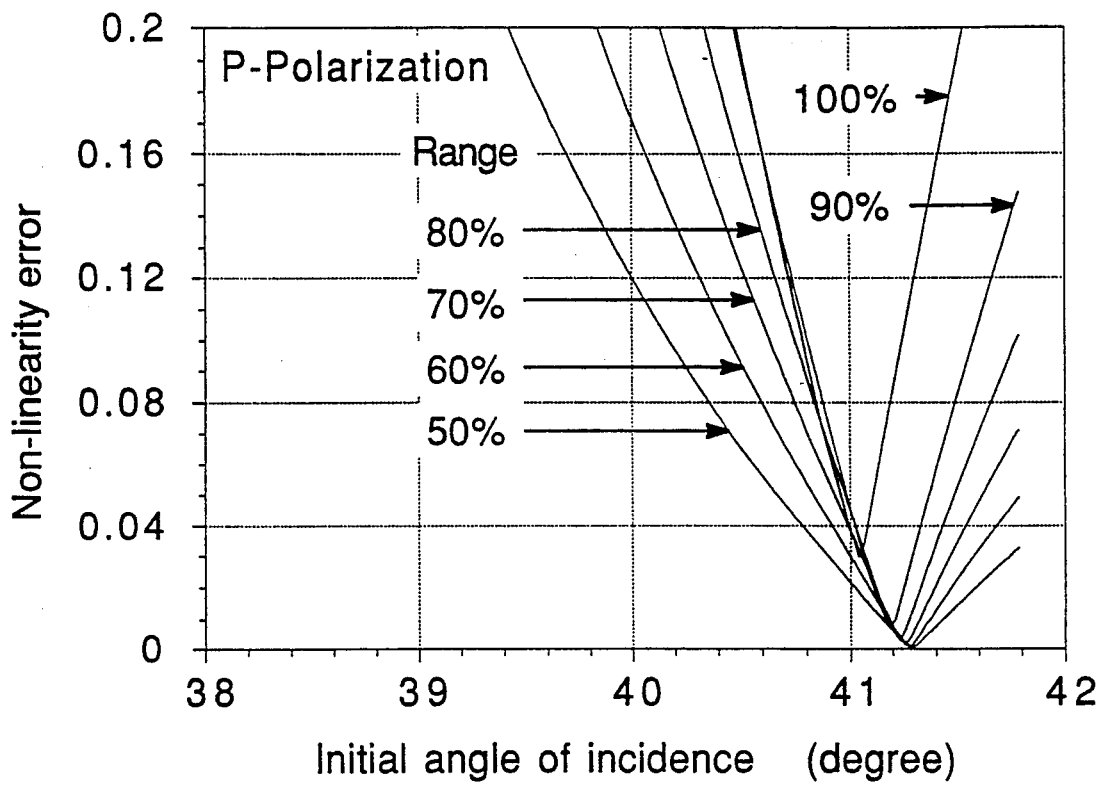
FIG. 9 is a graph of non-linearity error of the linearized reflectance of p-polarized light where "Range" is the percentage of the total measurable range.

FIGS. 8 and 9 show the non-linearity errors as functions of the initial angle of incidence. The non-linearity error is defined as the maximum deviation of the linearized reflectance curves from corresponding linear lines determined by $c_1$ and $d_1$. Six curves have been plotted, each for a different percentage of the total measurable range. We see that the smaller the percentage of the total measurable range being used, the smaller the non-linearity error. For s-polarized light, there exist two initial angles of incidence, 17.8° and 37.6°, at which the non-linearity error approaches zero. These two angles are optimum and should be chosen when designing a sensor for optimum performance. Notice if we set Eq.(13) to equal zero and solve for $\theta_2$ and then $\theta_1$ (disregard the solution for $\tan\theta_2=0$, which has no meaning), we obtain two solutions $$\theta_i = \sin^{-1}\left(\frac{1}{n_i}\sqrt{\frac{17 \pm \sqrt{321 - 96n_i^2}}{32}}\right) = 17.83°, 37.96°, \quad (17)$$

which are approximately equal to those determined from the non-linearity graphs. We can conclude that the non-linearity error is mainly due to the third order term in the linearized reflectance. Similarly, for the case of p-polarization it can be seen from FIG. 9 that there is only one optimal initial angle, 41.3° instead of two as in the case of s-polarization. By setting Eq.(16) equal to zero and solving numerically for $\theta_t$ and then $\theta_i$, we find that the solution is 41.29° which is approximately the same as the value obtained using the condition for smallest non-linearity error. As in the case of s-polarized light, we conclude that the non-linearity error is mainly due to the third order term in the linearized reflectance.

Figure 10:
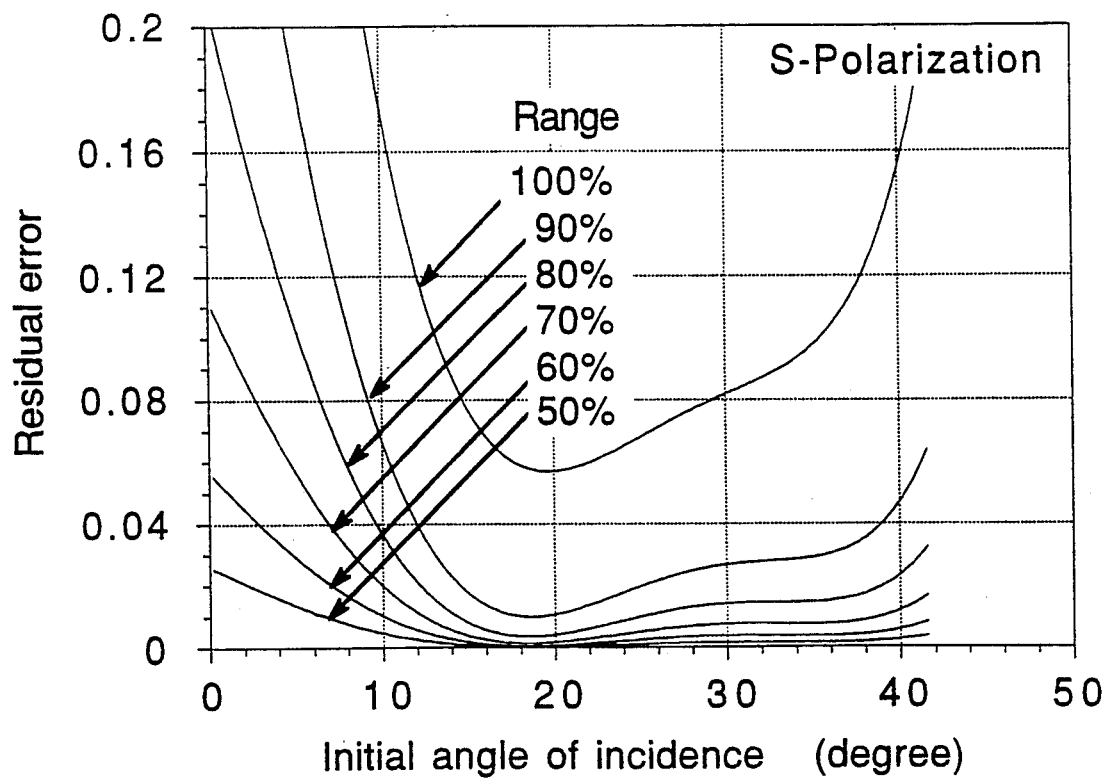
FIG. 10 is a graph of residual error of the linearized reflectance of s-polarized light fit with a 3rd order polynomial.
Figure 11:
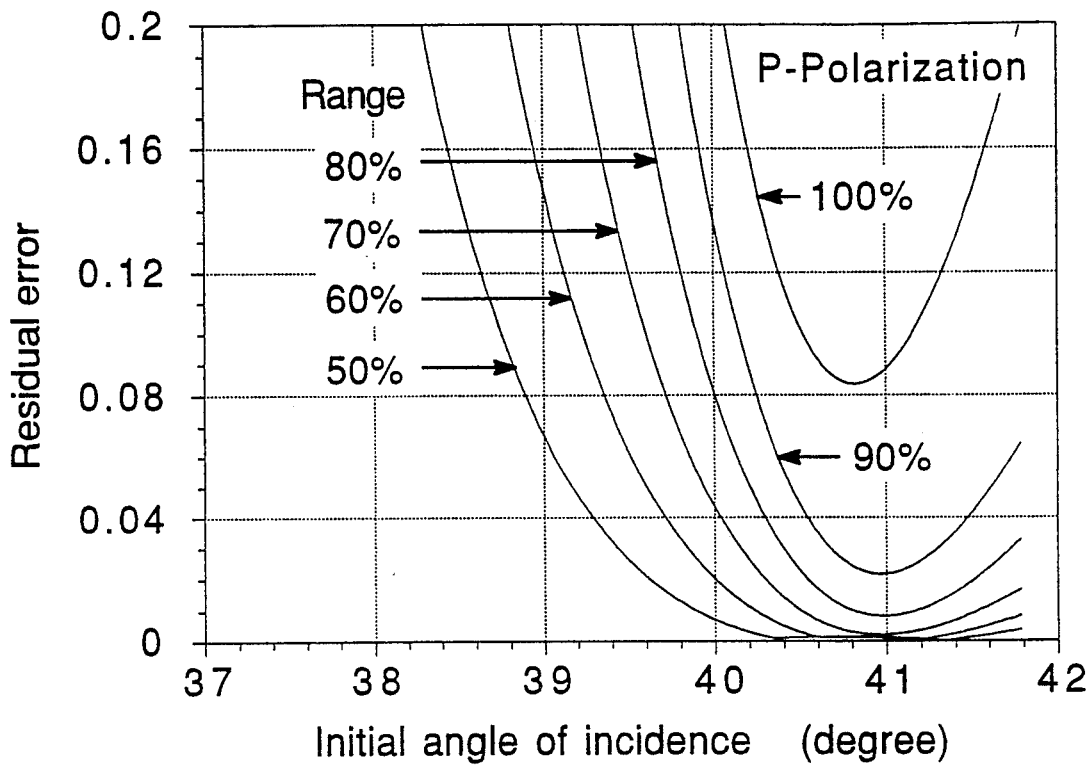
FIG. 11 is a graph of residual error of the linearized reflectance of p-polarized light fit with a 3rd order polynomial.

FIGS. 10 and 11 show the residual error of the linearized reflectance fit with both the first and third order terms. Compared with a fit using only the first order term, the errors are small in a much wider range, which gives more flexibility in the design process. Note that that the optimum angles are virtually unchanged.

Figure 12:
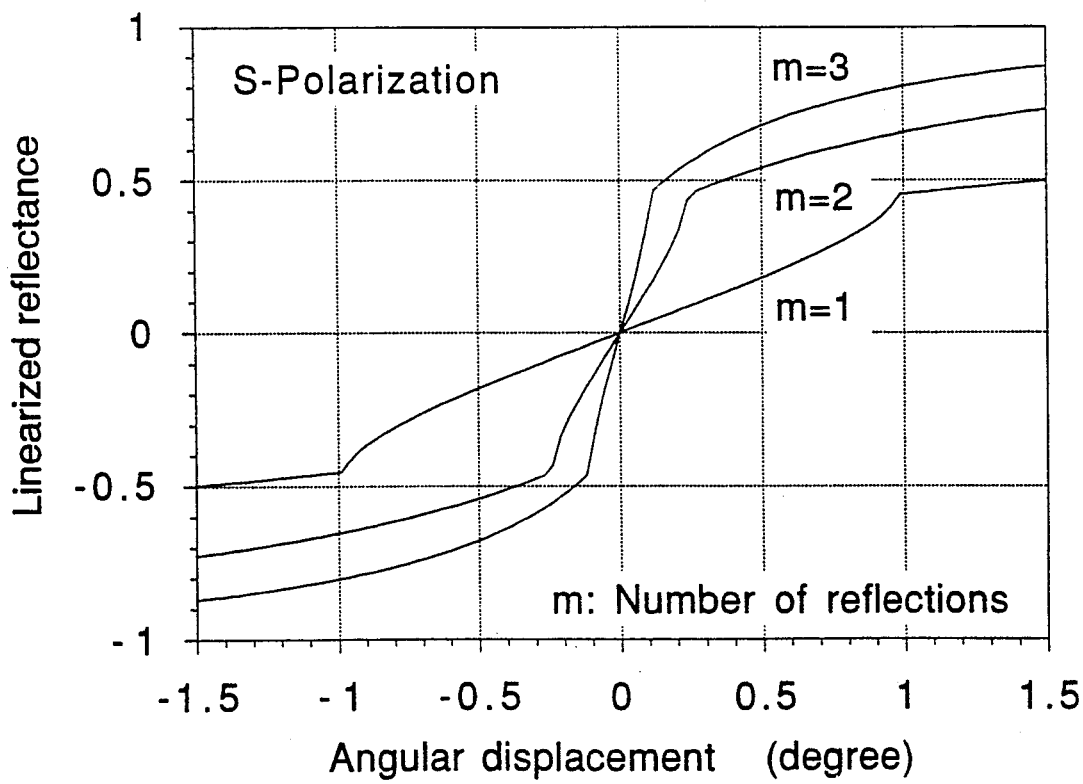
FIG. 12 is a graph of linearized reflectances for multiple reflections.

As seen in the above analysis, the sensitivity of this angle measurement method can be chosen by selecting the polarization state and the initial angle of incidence. Another significant advantage of this method is that the sensitivity can also be increased by introducing multiple reflections at identical boundaries. In this case, the reflectances become $R^m{}_s(\Delta\theta)$ and $R^m{}_p(\Delta\theta)$, where m is the number of the multiple reflections. FIG. 12 shows the linearized reflectances for up to three reflections. Clearly, the sensitivity increases rapidly with the number of reflections. This characteristic is extremely useful when the method is to be used for high resolution applications, since the only thing that needs to be altered for higher resolution is to extend the length of the reflection prisms. The only limiting factor is the geometric error and the inhomogeneity of the material of the reflection prisms.

Possible Error Sources

Two possible error sources of this method are:

1) Angular displacement of the laser beam in the plane perpendicular to the measurement plane.

Figure 13:
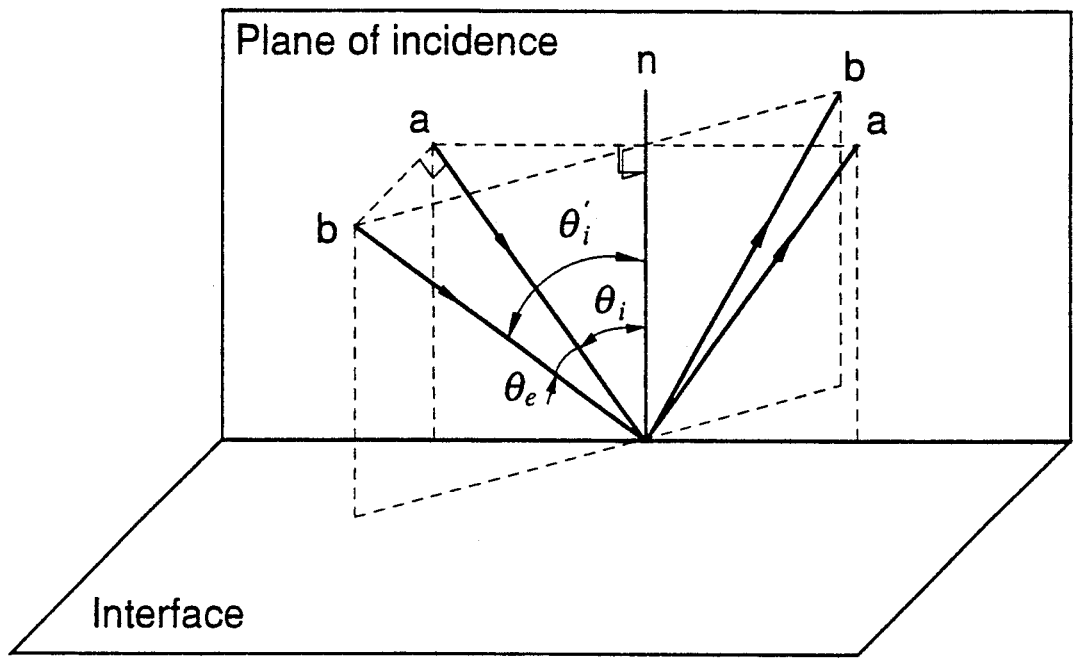
FIG. 13 illustrates measurement error due to the angular displacement in the plane perpendicular to the plane of incidence.

Angular displacement of the incident beam in the plane perpendicular to the measurement plane causes the actual angle of incidence of the beam to be larger than the angle of incidence in the measurement plane, which causes measurement error. Let $\theta_i$ be the angle of incidence in the measurement plane, which we want to measure, let $\theta_e$ be the angular displacement in the plane perpendicular to the measurement plane, and let $\theta'_i$ be the resultant angle of incidence. From the geometric relationship of the three angles, shown in FIG. 13, the following equation can be obtained.

$$\cos\theta'_i = \cos\theta_e \cos\theta_i \quad (18)$$

For high resolution measurement $\theta_e$ is small, and the resultant error can be neglected. For example, if $\theta_e = 1°$ the resultant error will be less than 0.015%. For wide range measurement $\theta_e$ is large, and the resultant error cannot be neglected. However, if two sets of the measuring unit are assembled together to measure the angular displacements in both directions, then Eq. 18 can be used to compensate the errors, providing higher accuracy. 2) Beam divergence.

Another possible error source is the divergence of the incident laser beam. In the above analysis we have assumed that the incident laser beam is a perfectly collimated beam and treated it as a single light ray. However, in reality, a laser beam always has a divergence which is inversely proportional to its diameter no matter how well it is collimated. The effect of beam divergence on the reflectance curve is the same as taking a running average of the reflectance curve. If the divergence is large, i.e., the running average length is long, the reflectance curve will be severely rounded near the ends of the measurement range, which reduces the linear range of the characteristic curve. However, for a typical beam divergence of 1-2 mrad, calculations show that the error is very small and can be neglected.

New Sensor Apparatus

Figure 14:
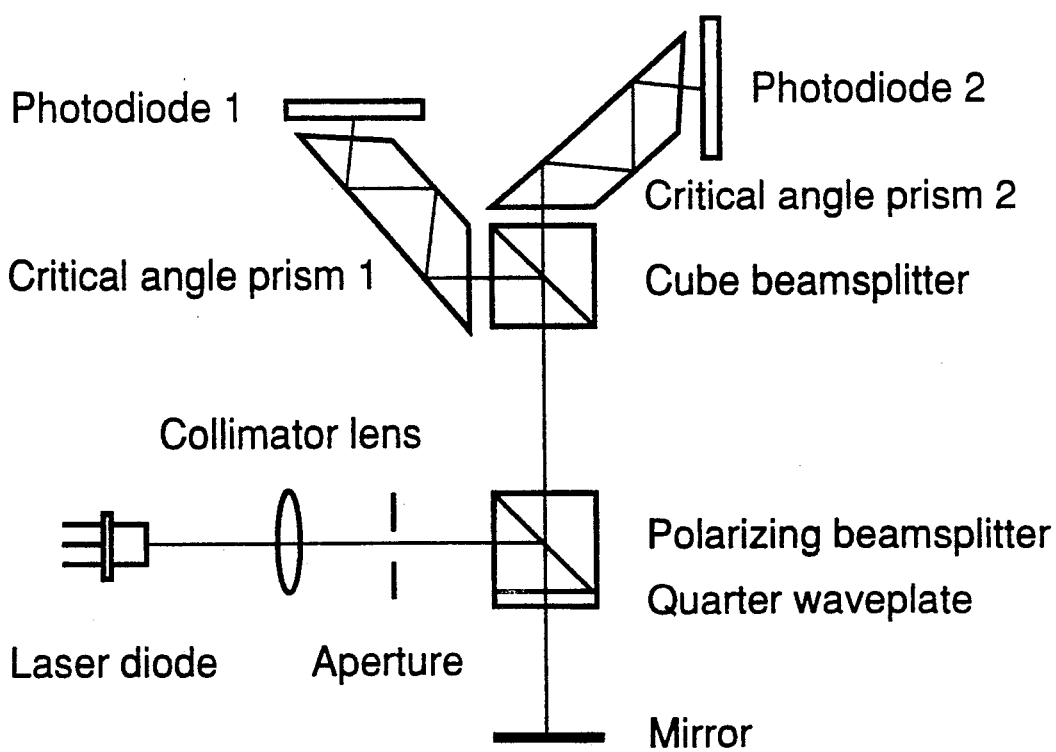
FIG. 14 illustrates an optical schematic of a prototype sensor.

In order to demonstrate the feasibility of the method discussed above, a small angle sensor based on this principle has been built. FIG. 14 shows the optical schematic of the sensor. A laser diode operating at a wavelength of 780 nm provides the light source. The output light beam is collimated by a collimator lens, and the light beam diameter is reduced to 1 mm by an aperture on a hard paper. The light beam is then directed to a mirror via a polarizing beamsplitter and a quarter wave plate. The mirror is the component subjected to the angular displacements. With the quarter wave plate the reflected beam passes totally through the polarizing beamsplitter. This light beam is then split by a cube beamsplitter into two identical beams. Two critical angle prisms are used as the reflection prisms. A critical angle prism is a prism whose hypotenuse face forms an angle equal to the critical angle with its incident face. As stated previously, for small angular displacement measurement, the initial angle of incidence is set to a value in the vicinity of the critical angle to ensure good resolution. By using critical angle prisms, unwanted reflection effects at the incident faces of the prisms can be minimized. To obtain even higher resolution, three time reflection type critical angle prisms are used in this sensor. Also, for the same reason, p-polarized light is used as the incident light. The initial angle of incidence is set so that the initial reflectance is approximately 0.5, which is not necessarily the optimal value in terms of smallest non-linearity error. The reflected light beams are collected by two photodiodes, and the generated photo currents are changed to voltages with amplification via built-in preamplifiers. The amplified signals are then sampled by a digital voltage meter and sent to a personal computer where the linearized reflectance is calculated.

Figure 15:
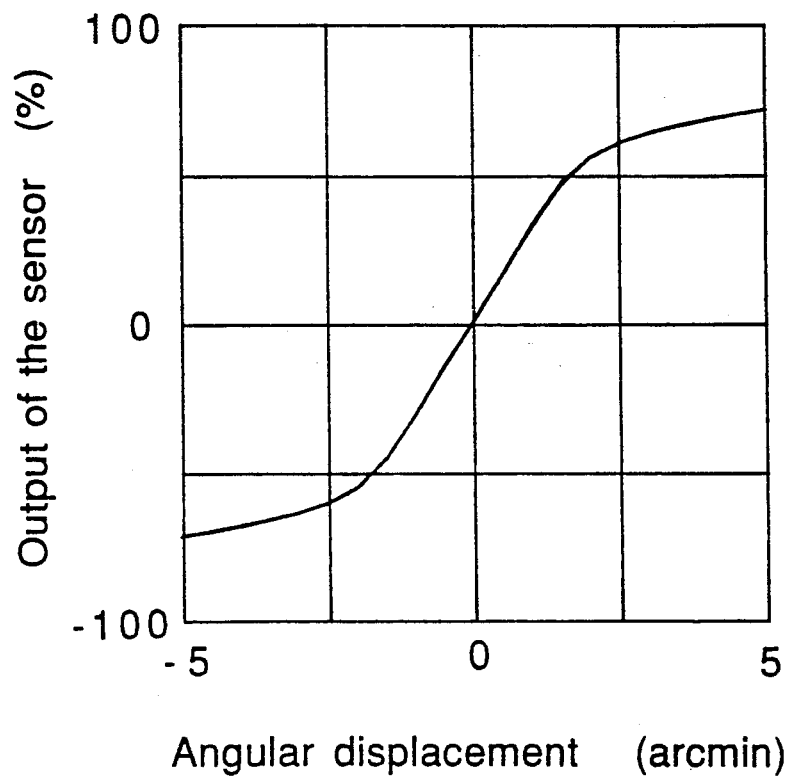
FIG. 15 is a graph of the characteristic curve of the prototype sensor.
Figure 16:
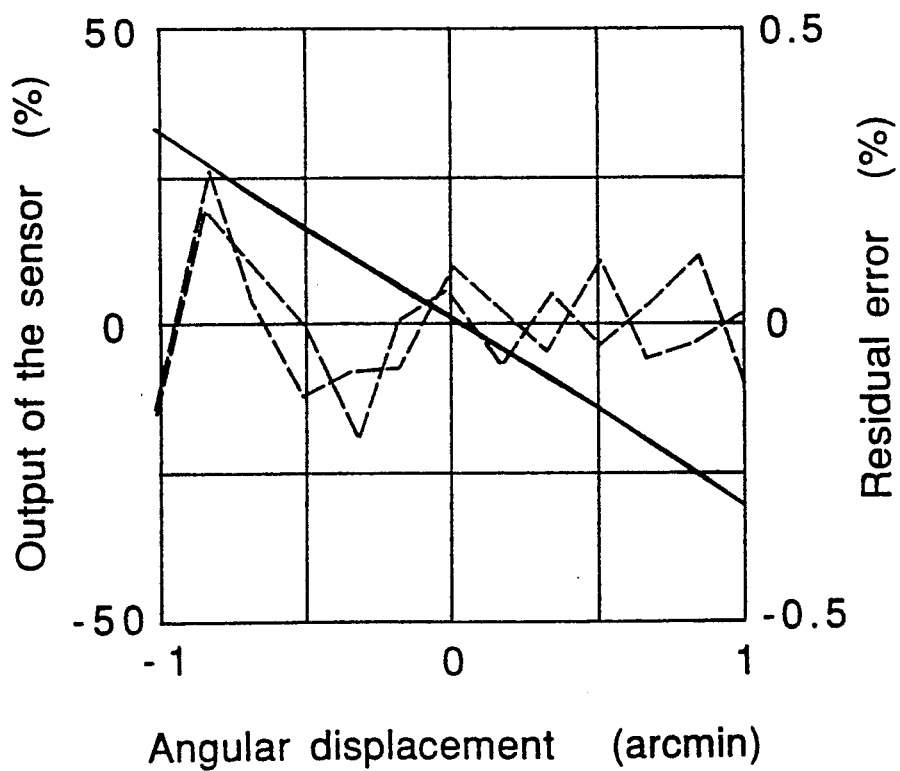
FIG. 16 is a graph of the central part of the characteristic curve and its residual error of curve fitting.
Figure 17:
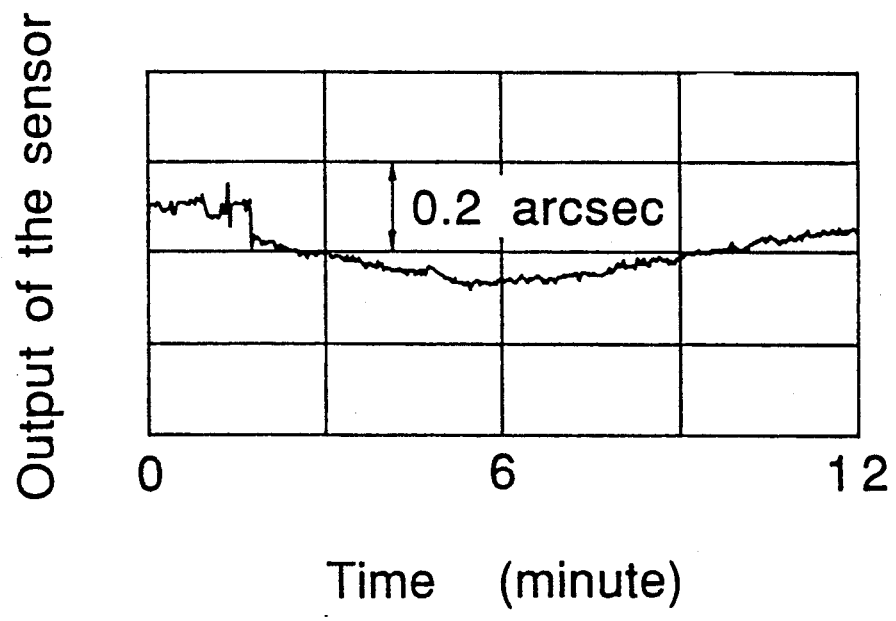
FIG. 17 is a graph of the noise and drift of the new sensor.

FIG. 15 shows the linearized reflectance curve of the sensor for a range of 10 minutes of arc. Good linearity is achieved for a range of approximately 3 minutes of arc. The improvement in linearity using the above differential method is qualitatively confirmed. In FIG. 16 we focus on the central 2 minutes of arc range and show the residual error when fit with a third order polynomial. The error is approximately 0.7%. The experiment was repeated twice and the results indicate a good repeatability. Also the stability, or drift, of the sensor was tested. FIG. 17 shows the result of a 12 minute test. The drift in this time period is approximately 0.2 second of arc and the noise level is approximately 0.02 second of arc over most of the test period.

Applications

The method of angle measurement proposed here is very different from conventional optical methods, which are generally based either on interference or auto-collimation. The advantage of the new method lies in the compact size, simple structure, low cost, and easy design of the sensors for a wide class of measurement ranges and required resolutions. Because of these unique advantages, the new method has applications in the fields of metrology, control, precision engineering and manufacturing technology. Some of the possible applications follow. For some of these applications conventional angle measurement methods are not possible.

1) Cantilever deflection detection and control of AFMs

In this interesting application, the new method can be used to measure and control the deflection of the cantilever in AFMs. Many AFM researchers currently use an interferometric method to measure the displacement of the cantilever instead of directly measuring the deflection angle. This configuration requires that the cantilever be fixed and the sample scanned during measurement, making the device suitable only for small sample and small scan area measurement. By using the new method, the cantilever's angular deflection rather than the indirect displacement can be measured, which means the cantilever can be scanned instead of the sample. This major advantage makes the device suitable for much wider applications. Another advantage of the new method comes from the compact size of the angular deflection measurement unit, which makes the whole device compact.

2) Surface profiling and vibration analysis

The prototype sensor configuration shown in FIG. 14 can be used for surface profiling of optical elements such as mirrors and lenses, which is conventionally performed by interferometers or autocollimators. Compact size, simple structure, and high resolution make the new method more suitable for on-line measurement of the products during machining. With the same configuration, the new method is also suitable for high accuracy vibration monitoring.

3) Geometric error measurement and accuracy control of moving tables

Generally geometric error measurement is performed with an interferometer. Although interferometers usually have high accuracy, they are essentially for off-line measurement. Consequently, they cannot be used for on-line real time geometric error measurement and accuracy control of machine tools. More recent developments use laser alignment techniques in which angular errors are measured by the auto-collimation method. This laser alignment technique shows promise for on-line measurement and compensation of geometric errors of machine tools. The new method can also be used for this application in real time and the compact size of the new device can make it easier to integrate with machine tools than the above laser alignment technique.

4) Laser pointing accuracy control and laser mirror servocontrols

Using the new angle measurement method, a laser beam's pointing accuracy can be monitored and controlled if combined with high accuracy active mirrors in a compact device. Similarly, sensors based on this method can be used on high accuracy monitoring devices for laser mirror servocontrol systems.

5) Wide range angle measurement

As seen in the analysis above, sensors using s-polarized light, low initial reflectance, and single reflection type prisms have a very wide measurement range with good linearity (approximately 48° at the optimal initial angle of incidence). Wide range measurement is difficult for conventional interferometers and autocollimators because of the non-linearity of the sin/tan function. For this application care should be taken to avoid any aberration in the prisms and the light noise due to the unwanted multiple reflections inside the prisms.

In summary, the angular displacement can be accurately measured using the linearized reflectance. The sensitivity, the measurement resolution and range are determined by the initial angle, the polarization state, and the number of reflections inside the prisms. Using a larger initial angle (close to the critical angle), p-polarization, and multiple reflection provides better resolution at the expense of reducing the measurement range. In theory, the resolution can be increased infinitely by increasing the number of reflections or the length of the prisms. In reality, though, resolution is limited by the geometric accuracy of the reflection prisms and the material inhomogeneity. The non-linearity error analysis reveals that there are two optimal initial angles for s-polarization and one for p-polarization. These initial angles are optimal in the sense that the non-linearity error of the linearized reflectance approaches zero. The initial angles should be used as criteria for achieving the best linearity performance.

We claim:

1. A method to measure the angular displacement ($\Delta\theta$) of an incoming light beam comprising the steps of:
splitting the beam into two identical light beams,
directing the light beams into a pair of prisms,
reflecting the light beams from the prisms to a pair of detectors sensitive to the light intensity of the light beams, measuring the changes in reflectance of each light beam ($R(\Delta\theta)$) and ($R(-\Delta\theta)$) relative to the reflectances of a light beam ($R(\Delta\theta=0)$) at an initial angle of incidence $\theta_0$ and calculating the angular displacement ($\Delta\theta$) from the formula:

$$R_l = \frac{R(\Delta\theta) - R(-\Delta\theta)}{R(\Delta\theta) + R(-\Delta\theta)} = B\Delta\theta \ldots$$

wherein parameter B is selected from the group $c_1$ or $d_1$ and where $$c_1 = 4 \tan \theta_t \text{ and}$$

$$d_1 = \frac{4 \tan \theta_t}{u} \text{ and}$$

where $u = -\cos(\theta_o - \theta_t)\cos(\theta_o + \theta_t)$.

2. The method according to claim 1 wherein the light beam is p-polarized and the angle of incidence is substantially close to the critical angle.

3. The method according to claim 1 wherein the light beam is s-polarized and the initial angle of incidence $\theta_o$ is selected to be substantially one of two angles where the non-linearity error is a minimum.

4. Apparatus to measure the angular displacement ($\Delta\theta$) of an incoming light beam relative to a light beam at an initial angle of incidence $\theta_o$ comprising a beamsplitter, a pair of prisms, one prism positioned with the incident face thereof to intercept one of two beams from the beamsplitter and the other prism positioned with the incident face thereof to intercept the other beam from the beamsplitter, each prism including at least one reflection interface to direct the respective beams to respective detectors sensitive to the light intensity of the beams, and means to calculate the angular displacement ($\Delta\theta$) of the incoming light beam from the outputs $R(\Delta\theta)$ and $R(-\Delta\theta)$ of the light detectors relative to the outputs for a light beam at an initial angle of incidence $\theta_o$ by the expression:

$$R_I = \frac{R(\Delta\theta) - R(-\Delta\theta)}{R(\Delta\theta) + R(-\Delta\theta)} = B\Delta\theta \ldots$$

wherein parameter B is selected from the group $c_1$ or $d_1$ and where $$c_1 = 4\tan\theta_t$$

or $$d_1 = \frac{4\tan\theta_t}{u} \text{ and}$$

where $u = -\cos(\theta_o - \theta_t)\cos(\theta_o + \theta_t)$.

5. The apparatus according to claim 4 wherein the light beam is p-polarized and the initial angle of incidence is substantially close to the critical angle.

6. The apparatus according to claim 4 wherein the light beam is s-polarized and the initial angle of incidence $\theta_o$ is selected to be substantially one of two angles where the non-linearity error is a minimum.

7. The method according to claim 1 wherein the light beam is non-polarized.

8. The method according to claim 1 wherein the light beams are reflected a plurality of times within each prism before the light beams are reflected from the prisms.

9. The method according to claim 1 wherein the light beam is p-polarized and the initial angle of incidence $\theta_o$ is selected to be substantially the angle where the non-linearity error is a minimum.

10. The apparatus according to claim 4 wherein the light beam is non-polarized.

11. The apparatus according to claim 4 wherein each prism includes reflective surfaces to cause the respective light beams to be each reflected a plurality of times before the light beams are directed to the respective detectors.

12. The apparatus according to claim 4 wherein the light beam is p-polarized and the initial angle of incidence $\theta_o$ is selected to be substantially the angle where the non-linearity error is a minimum.

13. The apparatus according to claim 4 wherein the prisms are each oriented to provide the same angle of incidence $\theta_o$ at the initial reflection interface of each prism for each of the light beams from the beamsplitter when the light beam is at the initial angle of incidence $\theta_o$.

14. A method to measure the angular displacement of an incoming light beam comprising the steps of:
splitting the beam into two identical light beams,
directing the light beams into a pair of prisms,
reflecting the light beams from the prisms to a pair of detectors sensitive to the light intensity of the light beams, measuring the changes in reflectance of each light beam ($R(\Delta\theta)$) and ($R(-\Delta\theta)$) relative to the reflectances of a light beam ($R(R\Delta\theta=0)$) at an initial angle of incidence $\theta_o$ and calculating the angular displacement ($\Delta\theta$) from the formula:

$$R_I = \frac{R(\Delta\theta) - R(-\Delta\theta)}{R(\Delta\theta) + R(-\Delta\theta)} = B\Delta\theta \ldots$$

where B is determined by physical calibration.

15. Apparatus to measure the angular displacement ($\Delta\theta$) of an incoming light beam relative to a light beam at an initial angle of incidence $\theta_o$ comprising a beamsplitter, a pair of prisms, one prism positioned with the incident face thereof to intercept one of two beams from the beamsplitters and the other prism positioned with the incident face thereof to intercept the other beam from the beamsplitter, each prism including at least one reflection interface to direct the respective beams to respective detectors sensitive to the light intensity of the beams, and means to calculate the angular displacement ($\Delta\theta$) of the incoming light beam from the outputs $R(\Delta\theta)$ and $R(-\Delta\theta)$ of the light detectors relative to the outputs for a light beam at an initial angle of incidence $\theta_o$ by the expression:

$$R_I = \frac{R(\Delta\theta) - R(-\Delta\theta)}{R(\Delta\theta) + R(-\Delta\theta)} = B\Delta\theta \ldots$$

where B is determined by physical calibration.

* * * * *